United States Patent [19]

Kreiner

[11] Patent Number: 4,882,394

[45] Date of Patent: Nov. 21, 1989

[54] METHOD FOR IMPROVING RUBBER CURE RATES

[75] Inventor: James G. Kreiner, Silver Lake, Ohio

[73] Assignee: General Tire, Inc., Akron, Ohio

[21] Appl. No.: 93,852

[22] Filed: Sep. 8, 1987

[51] Int. Cl.$^4$ .................................................. C08C 19/20
[52] U.S. Cl. .................................... 525/332.7; 525/346
[58] Field of Search ................. 525/333.1, 332.6, 332.7

[56] References Cited

U.S. PATENT DOCUMENTS 2,582,732 1/1952 Zerbe .................................. 525/346

OTHER PUBLICATIONS

Kautschuk and Gummi, 37, Jul. 1984, pp. 604–608.
Fegade, N. B. et al., Rubber World, Oct. 1984, pp. 32–37.

Primary Examiner—Christopher Henderson

[57] ABSTRACT

The cure or vulcanization rate of a rubber compound can be increased without adverse effects on the properties of the resulting cured rubber or rubber vulcanizate by replacing stearic acid or other acid in the rubber activator system with an amide like stearamide for activation of the sulfenamide acceleration of the vulcanization of rubber.

8 Claims, 3 Drawing Sheets

METHOD FOR IMPROVING RUBBER CURE RATES

Sulfur cure curves approaching the shape of a step function are very desirable for efficient curing operations. High cure rates are needed for this. Unfortunately, high rates are usually not possible without changing curative composition and/or increasing the curing temperature. Such modifications often change or degrade the final cured properties.

An object of this invention is to provide a method for overcoming the difficulties alluded to above and to obtain high cure rates without degrading the final properties of the cured or vulcanized elastomer or rubber composition.

These and other objects and advantages of the present invention will become more apparent to those skilled in the art from the following detailed description, examples and drawings wherein FIG. 1 is a vertical cross sectional view of a vulcanized pneumatic tire;

FIG. 21 is a rheogram showing the effect of cure system variations on cure characteristics at 150° C.;

SUMMARY OF THE INVENTION

A simple method has been found to more than double cure rates without changing curing temperature or curative compositions. Substitution of certain amides for stearic or other acid in the activation of the sulfenamide accelerated vulcanization of a rubber such as cis-1,4-polyisoprene yields greatly increased cure rates. These increased rates are obtained with little change in cured properties or ratio of crosslink types.

In general as compared to the acids:
(1) The amides gave much higher cure rates, shorter scorch times and higher reversion rates.
(2) The amides had lower modulus and hardness, but higher tensile strength and tan δ.

Also, aging results from several compounded rubber compositions show an advantage with an amide like stearamide. The compounds were air aged for 48 hours at 100° C. The properties of the stearamide containing compounds changed, on average, 30% less than the stearic acid containing compounds. The presence of stearic acid, or other carboxylic acid, even in small quantities, with the amides in rubber compounds nullifies the effect of amides on cure rate. Stearamide causes less M.W. degradation of tin coupled medium vinyl SSBR during rubber mixing than stearic acid.

DISCUSSION OF DETAILS AND PREFERRED EMBODIMENTS

Figure 1:
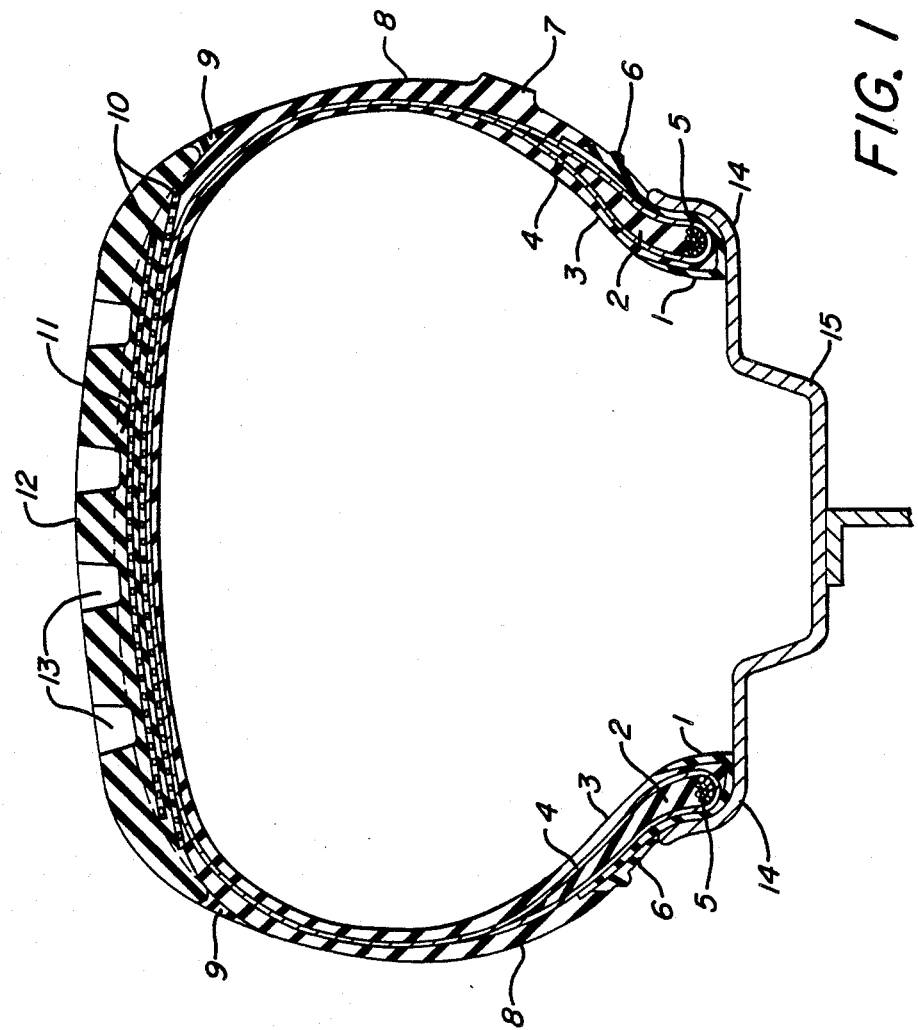

In FIG. 1 of the accompanying drawings, 1 and 1 are the chafers which may contain fabric and which wrap around the bead area of the tire. 2 and 2 are the bead fillers. The inner liner is shown at 3 and usually is of butyl, brominated butyl or chlorinated butyl rubber. A carcass ply of rubberized fabric is shown at 4. 5—5 and 6—6 are the bead bundles and rim strips, respectively, of the tire. The white sidewall is shown at 7. The sidewalls are shown at 8—8, and the wingtips are shown at 9—9. The belts are shown at 10 and 10. The tire, also, contains a tread base 11, tread cap 12 and grooves 13-13. The tire is shown mounted on a wheel such as one of steel containing rim flange 14—14 and a rim 15.

The rubbers which can be used in the practice of the present invention are natural rubber and polyisoprene such as high cis (ca. 92–98%) solution polymerized isoprene, medium or high vinyl solution polymerized SBR (styrene-butadiene rubber), medium or high vinyl solution polymerized polybutadiene, cis-polybutadiene, high trans solution polymerized SBR, emulsion SBR and mixtures of the same. Also, these may be used, solution polymerized rubbery high trans-high vinyl diblock copolymers, blends of rubbery high trans copolymers and rubbery high vinyl polymers, and mixtures (alloys and blends) of said diblock copolymers, high trans copolymers and high vinyl polymers from butadiene-1,3 and at least one of styrene or isoprene as shown in U.S. Pat. No. 4,616,065. The solution polymerized polymers may be tin coupled. Mixtures of rubbers can be used.

The rubber composition may contain the other usual rubber compounding ingredients such as reinforcing carbon black, titanium dioxide, silicates, carbonates, oil, antioxidants, silica, clay and so forth.

The curing system comprises sulfur, sulfenamide accelerator, the amide and zinc oxide.

The sulfur can be Rubber Makers sulfur or polymerized (insoluble) sulfur in oil.

The sulfenamide accelerators include N-tert-butyl-2-benzothiazole sulfenamide, N-cyclohexyl-2-benzothiazole sulfenamide (preferred), N,N-diisopropyl-2-benzothiazole sulfenamide, N,N-dicyclohexyl-2-benzothiazole sulfenamide, N-oxydiethylene-2-benzothiazole sulfenamide, the like and mixtures of the same. Sulfenamide accelerators are well known as shown by Hofmann, "Vulcanization And Vulcanizing Agents," Palmerton, Publishing Co., Inc., New York, 1967, pages 143 to 147 and Blokh, "Organic Accelerators in the Vulcanization of Rubber," Israel Program for Scientific Translations Ltd., Jerusalem, 1968, pages 8, 45 to 54, 183, and 219 to 224.

The amides used in the practice of the present invention have the formula:

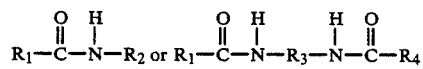

where $R_1$, $R_3$ and $R_4$ are linear, branched or cyclic $C_1$ to $C_{25}$ saturated or unsaturated, aliphatic, hydrocarbon radicals and where $R_2$ is hydrogen or a linear, branched or cyclic $C_1$ to $C_{25}$ saturated or unsaturated, aliphatic, hydrocarbon radical and mixtures of the same.

Examples of the amides are acetamide, propionamide, n-butyramide, n-valeramide, n-caproamide, stearamide (preferred), lauroyamide, myristic amide, arachidamide, behenamide, ethylene-bis-stearamide, octadecyl stearamide and the like and mixtures of the same. The amides can be produced by the reaction of a fatty acid (or its acid chloride or ester) with ammonia or an amine. Please see "Encyclopedia of Chemical Technology," Kirk-Othmer, Third Edition, Vol. 2, John Wiley & Sons, New York, 1978, pages 252 to 257 and "Organic Chemistry," Fieser and Fieser, D. C. Heath and Company, Boston, 1944, pages 183, 184, 232 and 242.

The zinc oxide, sulfur, accelerator and amide are used in the rubber composition or compound in minor amounts by weight sufficient to vulcanize the rubber without adversely affecting the physical properties of the resulting vulcanizate. In general based on 100 parts by weight of rubber (phr) in the composition the zinc oxide is used in an amount of about 5.0 phr, the amide is used in an amount of from about 0.5 to 5.0 phr, the sulfenamide accelerator is used in an amount of from about 0.5 to 1.5 phr and the sulfur is used in an amount of from about 2.0 to 5.0 phr.

Optionally and desirably the vulcanizable rubber composition may contain inhibitors or retarders like phthalic anhydride, N-(cyclohexylthio)-phthalimide (preferred), or hexaiospropylthio melamine (preferred) and so forth. The retarder is used in a minor amount by weight sufficient to prevent scorch. In general it is used in an amont of from about 0.1 to 0.5 phr.

The composition of this invention can be used in various parts of a tire such as in the tread (cap and base) (preferred), wing tips, sidewalls, shoulder pads, cushion, rim strip, bead, ply and belt stocks and so forth. It can be used not only in the manufacturing of pneumatic radial (preferred), bias and bias belted tires for automobiles but also in making tires for trucks, off-the-road vehicles, buses, farm vehicles, airplanes, recreational vehicles and trailers. It can be used in the manufacture of conveyor belts, V-belts, tennis balls, bushings (silent blocs), windshield wiper blades, gaskets and so forth.

The following examples will serve to illustrate the present invention with more particularity to those skilled in the art.

The basic rubber composition used in the various runs is shown in Table I, below:

TABLE I

| Ingredient | Parts By Weight |
|---|---|
| IR, NATSYN 2200[1] | 100 |
| Reinforcing Carbon Black, N220 | 45 |
| Process Oil | 5 |
| Zinc Oxide | 5 |
| AgeRite Resin D[2] | 1 |
| Amide | Variable |
| SANTOCURE[3] | Variable |
| Sulfur (Rubber Makers) | Variable |
| SANTOGARD PVI[4] | Variable |

[1]Solution polymerized isoprene dry rubber 98% cis, nominal Mooney viscosity ML1 + 4 at 100°C. of 82. Goodyear.
[2]Polymerized 1,2-dihydro-2,2,4-trimethylquinoline, antioxidant, R. T. Vanderbilt.
[3]N—cyclohexyl-2-benzothiazole-sulfenamide, accelerator, CBS. Monsanto.
[4]N—(cyclohexylthio)phthalimide, retarder. Monsanto.

The compositions or compounds were mixed in a two-pass mix in an internal mixer such as a Banbury mixer. Part of the resulting compounds were molded and cured at 150° C. Other compounds were tested in a Monsanto Oscillating Disk Rheometer (ASTM D 2084-84) at 150° C. The results for the compounds are shown below in Table II:

TABLE II

| Material/Results | A | B |
|---|---|---|
| Stearic Acid, phr | 3 | — |
| Stearamide, phr | — | 3 |
| SANTOCURE, phr | .75 | .75 |
| Sulfur, phr | 2.5 | 2.5 |
| PVI, phr | — | — |
| ML-1 + 4 at 100° C. (unvulcanized) | 65 | 63 |
| T$_{90}$ at 150° C., min. | 15.2 | 8.6 |
| Scorch Time, min. | 6.5 | 5.3 |
| Cure Rate, sec$^{-1}$ | .315 | 1.386 |
| Reversion Rate, % change/min. | −.204 | −.441 |
| Vr* Total | .3000 | .2823 |
| Vr$_{SX}$(%) | .1260 (42) | .1499 (53.1) |
| Vr$_{S2}$(%) | .0755 (25.2) | .0466 (16.5) |
| Vr$_{S1}$(%) | .0985 (32.8) | .0858 (30.4) |
| Modulus @ 100%, MPa | 2.0 | 1.5 |
| Modulus @ 300%, MPa | 9.0 | 6.6 |
| Tensile Strength, MPa | 26.5 | 23.4 |
| Elongation @ Break, % | 596 | 636 |
| Hardness, Shore A | 58 | 56 |
| Yerzley tan ζ | .220 | .255 |

| Material/Results | C | D |
|---|---|---|
| Stearic Acid, phr | — | — |
| Stearamide, phr | 3 | 3 |
| SANTOCURE, phr | 1.0 | 1.0 |
| Sulfur, phr | 3.33 | 3.33 |
| PVI, phr | .2 | .4 |
| ML-1 + 4 at 100° C. (unvulcanized) | 61 | 61 |
| T$_{90}$ at 150° C., min. | 13.4 | 17.0 |
| Scorch Time, min. | 8.7 | 11.0 |
| Cure Rate, sec$^{-1}$ | .990 | .770 |
| Reversion Rate, % change/min. | −.372 | −.403 |
| Vr* Total | .3125 | .3104 |
| Vr$_{SX}$(%) | .1241 (39.7) | .1165 (37.5) |
| Vr$_{S2}$(%) | .0875 (28.0) | .0882 (28.4) |
| Vr$_{S1}$(%) | .1009 (32.3) | .1057 (34.1) |
| Modulus @ 100%, MPa | 2.1 | 2.1 |
| Modulus @ 300%, MPa | 8.6 | 8.8 |
| Tensile Strength, MPa | 25.9 | 25.6 |
| Elongation @ Break, % | 620 | 610 |
| Hardness, Shore A | 60 | 60 |
| Yerzley tan ζ | .223 | .242 |

*Vr = Volume fraction of crosslinked rubber in n-decane at 25° C.
Sx polysulfide linkages
S2 disulfide linkages
S1 monosulfide linkages
MPa = Megapascal
T$_{90}$ = time to 90 percent state of cure for compounds as determined by the Monsanto Oscillating Disk Rheometer.

Yerzley Loss Tangent Delta (Tan δ)

Tan was measured by means of an Instrumented Yerzley Oscillograph (IYO) at room temperature (ca. 25° C.) and 5 Hertz. The Yerzley Oscillograph is a good predictor of twin-roll rolling resistance of tire tread material formulations. The lower the tan δ value, the lower the rolling resistance.

Additional runs were made and the results obtained are shown in Table III.

TABLE III

| Material/Results | E | F | G |
|---|---|---|---|
| Stearic Acid, phr | 3 | — | — |
| Stearamide, phr | — | 3 | 3 |
| SANTOCURE, phr | 1.00 | 1.25 | 1.25 |
| Sulfur, phr | 3.33 | 4.17 | 4.17 |
| PVI, phr | — | .2 | .4 |
| ML-1 + 4 at 100° C. (unvulcanized) | 65 | 61 | 61 |
| T$_{90}$ at 150° C., min. | 13.7 | 9.25 | 15.8 |
| Scorch Time, min. | 6.3 | 5.20 | 10.0 |
| Cure Rate, sec$^{-1}$ | .408 | 1.155 | .770 |
| Reversion Rate, % change/min. | −.420 | −.319 | −.402 |
| Modulus @ 100%, MPa | 2.7 | 2.7 | 2.5 |
| Modulus @ 300%, MPa | 11.9 | 10.8 | 10.2 |
| Tensile Strength, MPa | 25.6 | 24.7 | 24.2 |
| Elongation @ Break, % | 513 | 538 | 549 |
| Hardness, Shore A | 62 | 64 | 61 |
| Yerzley tan ζ | .195 | .196 | .205 |

Differences in cured properties can be overcome by increasing total curatives. Scorch times were increased by the addition of small amounts of PVI which delays onset of vulcanization but does not change the shape of the Rheometer cure curve (cure rate).

Figure 2:
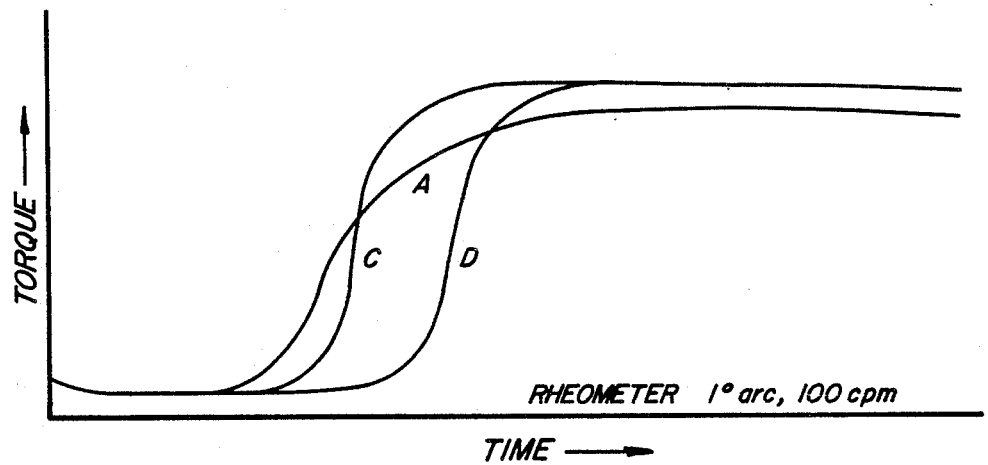
Figure 3:
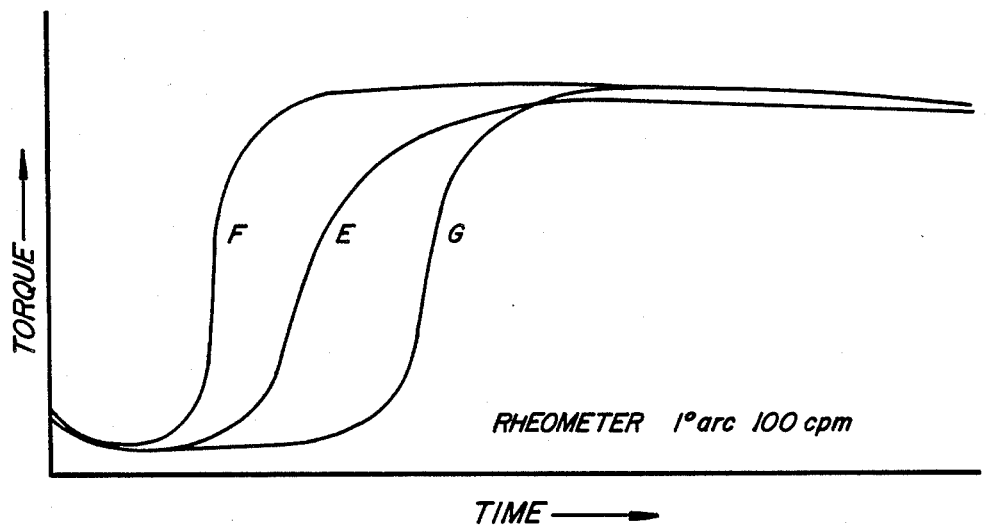
FIG. 3 is a rheogram showing the effect of other cure system variations on cure characteristics at 150° C.

The above compounds demonstrate that equivalent cured properties and scorch are possible while retaining fast cure rates (Tables II and III, FIGS. 2 and 3).

Compounds C and D, in Table II and FIG. 2, are not an exact match for control compound A. However, they do demonstrate the potential to match original properties and crosslinks through increased total curatives and PVI. A better example of matching properties to a control is given in Table III and FIG. 3. Compounds F and G come quite close to control E. The scorch is bracketed but could be matched readily by adjusting PVI content. Crosslink data were not obtained for these compounds.

Figure 4:
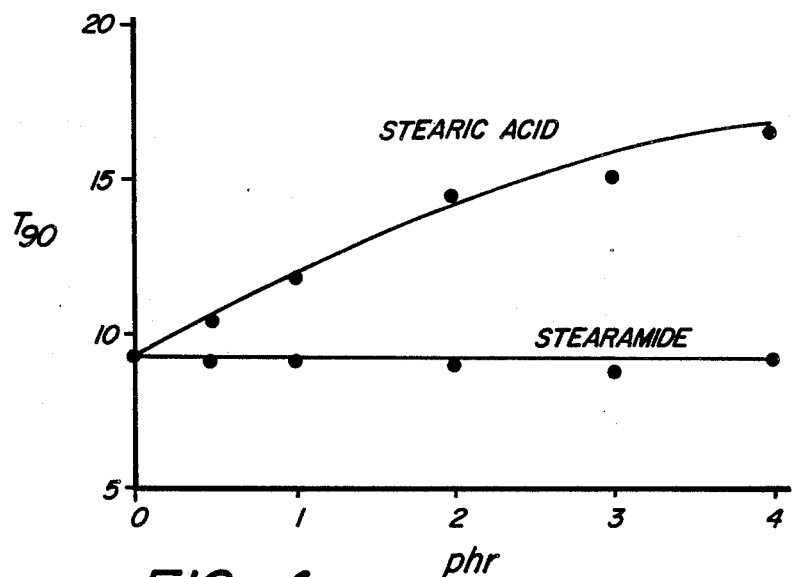
FIG. 4 is a graph showing the effect of activator concentration on $T_{90}$.
Figure 5:
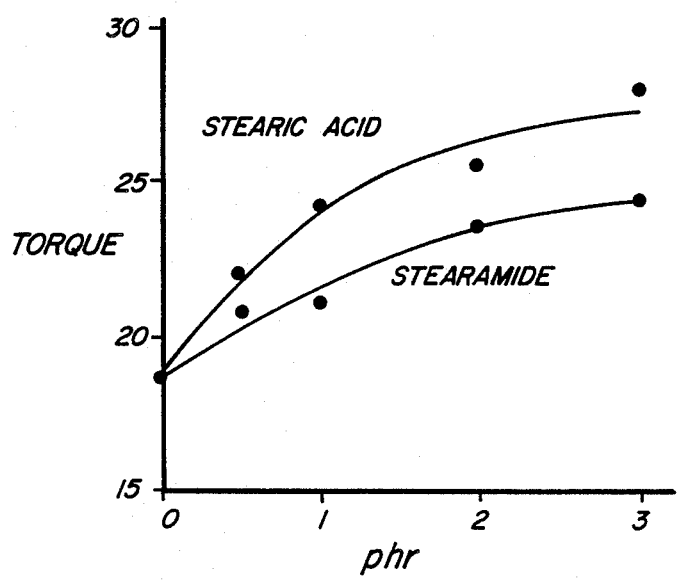
FIG. 5 is a graph showing the effect of activator concentration on torque.

Rheometer data and cured properties indicate that stearamide takes part in the vulcanization reaction. As the stearic acid or stearamide concentrations are increased from 0 to 3 phr, $T_{90}$ of the control compound becomes 50 percent longer for stearic acid but remains unchanged for stearamide (FIG. 4). The torque or total crosslink density increases with increasing concentration of both activators (FIG. 5). At 3 phr, the torque for stearic acid has risen about 50 percent, for stearamide, about 33 percent. The influence of stearamide concentration on total crosslink density indicates involvement in the vulcanization reaction. The manner in which stearamide takes part in the vulcanization reaction is not clear, however.

However, as a replacement for stearic acid in the rubber activator system the amide is more effective.

Various amides were substituted for stearic acid on an equivalent weight basis and evaluated in the previously described IR compound (Table I). Table IV compares lauroyl amide with lauric and stearic acids. The total curatives in compound K were increased by ⅓ to yield properties similar to those of lauric acid. The fast cure rate was maintained. Three amides and the respective acids (lauric, myristic and stearic) are compared in Table V. The cure rates for the amide containing compounds are much higher. Table VI presents data for acetamide, caproic amide and other amides. Again, the amides provide much faster cure rates.

The results obtained are set forth in the Tables below:

TABLE IV

| Material/Results | H | I |
|---|---|---|
| Stearic Acid, phr | 3 | — |
| Lauric Acid, phr | — | 2.11 |
| Lauroyl Amide ($C_{12}$), phr | — | — |
| SANTOCURE, phr | .75 | .75 |
| Sulfur, phr | 2.5 | 2.5 |
| $T_{90}$ at 150° C., min. | 15 | 15 |
| Scorch Time, min. | 6.0 | 5.0 |
| Cure Rate, $sec^{-1}$ | .252 | .347 |
| Reversion Rate, % change/min. | −.347 | −.400 |
| Modulus @ 100%, MPa | 1.9 | 1.7 |
| Modulus @ 300%, MPa | 8.4 | 7.6 |
| Tensile Strength, MPa | 26.3 | 26.3 |
| Elongation @ Break, % | 624 | 652 |
| Hardness, Shore A | 59 | 58 |
| Yerzley tan ζ | .246 | .226 |
| Material/Results | J | K |
| Stearic Acid, phr | — | — |
| Lauric Acid, phr | — | — |
| Lauroyl Amide ($C_{12}$), phr | 2.11 | 2.11 |
| SANTOCURE, phr | .75 | 1.0 |
| Sulfur, phr | 2.5 | 3.33 |
| $T_{90}$ at 150° C., min. | 6 | 6 |
| Scorch Time, min. | 3.0 | 3.0 |
| Cure Rate, $sec^{-1}$ | 1.386 | 1.386 |
| Reversion Rate, % change/min. | −.255 | −.200 |
| Modulus @ 100%, MPa | 1.3 | 1.7 |
| Modulus @ 300%, Mpa | 5.7 | 7.1 |
| Tensile Strength, MPa | 25.0 | 24.4 |
| Elongation @ Break, % | 699 | 632 |
| Hardness, Shore A | 58 | 61 |
| Yerzley tan ζ | .256 | .229 |

TABLE V

| Material/Results | L | M | N |
|---|---|---|---|
| Lauric Acid, phr | 3.17 | — | — |
| Myristic Acid, phr | — | 3.61 | — |
| Stearic Acid, phr | — | — | 4.5 |
| Lauroyl Amide ($C_{12}$), phr | — | — | — |
| Myristic Amide ($C_{14}$), phr | — | — | — |
| Stearamide ($C_{18}$), phr | — | — | — |
| SANTOCURE, phr | .75 | .75 | .75 |
| Sulfur, phr | 2.5 | 2.5 | 2.5 |
| $T_{90}$ at 150° C., min. | 14 | 12 | 16 |
| Scorch Time, min. | 5.4 | 5.4 | 5.5 |
| Cure Rate, $sec^{-1}$ | .277 | .257 | .267 |
| Reversion Rate, % change/min. | −.180 | −.242 | −.120 |
| Modulus @ 100%, MPa | 2.3 | 2.2 | 2.4 |
| Modulus @ 300%, MPa | 9.8 | 9.4 | 10.0 |
| Tensile Strength, MPa | 26.6 | 24.9 | 25.9 |
| Elongation @ Break, % | 611 | 589 | 590 |
| Hardness, Shore A | 66 | 66 | 68 |
| Yerzley tan ζ | .192 | .195 | .209 |
| Material/Results | O | P | Q |
| Lauric Acid, phr | — | — | — |
| Myristic Acid, phr | — | — | — |
| Stearic Acid, phr | — | — | — |
| Lauroyl Amide ($C_{12}$), phr | 3.17 | — | — |
| Myristic Amide ($C_{14}$), phr | — | 3.61 | — |
| Stearamide ($C_{18}$), phr | — | — | 4.5 |
| SANTOCURE, phr | .75 | .75 | .75 |
| Sulfur, phr | 2.5 | 2.5 | 2.5 |
| $T_{90}$ at 150° C., min. | 6 | 6 | 6 |
| Scorch Time, min. | 2.4 | 2.3 | 2.8 |
| Cure Rate, $sec^{-1}$ | .866 | .815 | .866 |
| Reversion Rate, % change/min. | −.344 | −.350 | −.311 |
| Modulus @ 100%, MPa | 2.0 | 2.1 | 2.0 |
| Modulus @ 300%, MPa | 7.7 | 8.1 | 7.8 |
| Tensile Strength, MPa | 26.8 | 26.6 | 26.9 |
| Elongation @ Break, % | 673 | 659 | 672 |
| Hardness, Shore A | 63 | 66 | 64 |
| Yerzley tan ζ | .214 | .229 | .212 |

TABLE VI

| Material/Results | R | S | T |
|---|---|---|---|
| Stearic Acid, phr | 3 | — | — |
| Stearamide ($C_{18}$), phr | — | 3 | — |
| KEMAMIDE S (Humko Chemical)[1] ($C_{18}$), phr | — | — | 3 |
| KEMAMIDE B (Humko Chemical)[2] ($C_{20,22}$), phr | — | — | — |
| Acetamide ($C_2$), phr | — | — | — |
| Caproic Amide ($C_6$), phr | — | — | — |
| SANTOCURE, phr | .75 | .75 | .75 |
| Sulfur, phr | 2.5 | 2.5 | 2.5 |
| $T_{90}$ at 150° C, min. | 13 | 7.8 | 7.8 |
| Scorch Time, min. | 4.8 | 3.9 | 3.9 |
| Cure Rate, $sec^{-1}$ | .289 | .693 | .693 |
| Reversion Rate, % change/min | −.242 | −.366 | −.385 |
| Modulus @ 100%, MPa | 2.5 | 2.2 | 2.1 |
| Modulus @ 300%, MPa | 10.8 | 9.3 | 8.8 |
| Tensile Strength, MPa | 26.0 | 27.2 | 26.6 |
| Elongation @ Break, % | 551 | 621 | 622 |
| Hardness, Shore A | 66 | 62 | 62 |
| Yerzley tan ζ | .203 | .222 | .224 |
| Material/Results | U | V | W |
| Stearic Acid, phr | — | — | — |
| Stearamide ($C_{18}$), phr | — | — | — |
| KEMAMIDE S (Humko Chemical)[1] | — | — | — |

TABLE VI-continued

| | | | |
|---|---|---|---|
| ($C_{18}$), phr | | | |
| KEMAMIDE B (Humko Chemical)[2] ($C_{20, 22}$), phr | 3.44 | — | — |
| Acetamide ($C_2$), phr | — | .62 | — |
| Caproic Amide ($C_6$), phr | — | — | 1.23 |
| SANTOCURE, phr | .75 | .75 | .75 |
| Sulfur, phr | 2.5 | 2.5 | 2.5 |
| $T_{90}$ at 150° C., min. | 8.3 | 9.7 | 6.7 |
| Scorch Time, min. | 4.2 | 5.3 | 3.8 |
| Cure Rate, sec$^{-1}$ | .630 | .578 | 1.155 |
| Reversion Rate; % change/min. | −.346 | −.396 | −.395 |
| Modulus @ 100%, MPa | 2.1 | 2.6 | 2.1 |
| Modulus @ 300%, MPa | 8.8 | 11 | 8.9 |
| Tensile Strength, MPa | 26.8 | 26.9 | 27.2 |
| Elongation @ Break, % | 637 | 568 | 632 |
| Hardness, Shore A | 62 | 64 | 61 |
| Yerzley tan ζ | .233 | .211 | .224 |

| Material/Results | X |
|---|---|
| SANTOCURE, phr | .75 |
| Sulfur, phr | 2.50 |
| Ethylene-bis-stearamide, phr | 3.00 |
| ML-1 + 4 at 100° C., unvulcanized | 69 |
| $T_{90}$ at 150° C., min. | 7.7 |
| Scorch, min (TSI) | 4.5 |
| Cure Rate, sec$^{-1}$ | .866 |
| Reversion Rate, % change/min. | −.385 |
| Modulus 100%, MPa | 2.2 |
| Modulus 300%, MPa | 8.5 |
| Tensile Strength, MPa | 25.8 |
| Elongation at break | 607 |
| Hardness, Shore A | 64 |
| Yerzely tan ζ | .238 |

[1]Stearamide
[2]A mixture of arachidamide ($C_{20}$) and behenamide ($C_{22}$).

In the stearamide formulations replacement of the accelerator N-cyclohexyl-2-benzothiazole sulfenamide with equivalent amounts of accelerators like N-t-butyl-2-benzothiazole sulfenamide, N-oxydiethylene-2-benzothiazole sulfenamide, N,N-dicyclohexyl-2-benzothiazole sulfenamide and N,N-diisopropyl-2-benzothiazole sulfenamide gave varying results which in general were better than those obtained with similar compounds where stearic acid was used as the activator.

Replacement of the high cis-polyisoprene by natural rubber in the stearamide/sulfenamide compositions gave similar results and without any major changes. Apparently the naturally occurring non-rubber solids in natural rubber had no major effect on stearamide activation.

High cis-polyisoprene rubber was replaced in the stearamide/N-cyclohexyl-2-benzothiazole sulfenamide composition with high cis-polybutadiene rubber (BR) emulsion styrene-butadiene rubber (ESBR, SBR 1502), medium vinyl solution butadiene-styrene rubber (MVSBR), and high trans solution butadiene-styrene rubber (HTSBR). Results obtained showed the positive effect stearamide had on the cure rate and cure time of all these elastomers. Stearamide had a very large effect on the cure rates of cis-BR and HTSBR increasing them 5.3 and 3.5 times respectively. SBR 1502 had the least change at 1.9 times. SBR 1502 also had the least change in scorch and cure times. Scorch times for the different rubbers decreased seven to 30 percent. The low response of the SBR 1502 was apparently caused, in some part, by residual carboxylic acids from the emulsion polymerization soaps.

Stearic acid, lauric acid, lauroylamine and stearamide at three levels of each plus 0.75 phr MBTS and 2.5 phr sulfur were compounded in the natural rubber composition of Table I, above, and cured. As compared to the corresponding acids in the rubber compounds, the amides gave shorter cure times, shorter scorch times and increased cure rates. Also the amides gave lower cured moduli and tensile strengths. Moreover, the amides gave higher Yerzley tan delta. MBTS is mercaptobenzothiazole disulfide.

Furthermore, the lauroyl amide and stearamide MBTS systems were compared with the CBS-amide systems of Runs B-D, F, G, J, K, O-Q and S-X of the application. On average the CBS-amide systems were better than the MBTS-amide systems as follows: $T_{90}$ faster; longer scorch time; faster cure rate; higher 100% modulus, 300% modulus and tensile strength; about the same elongation and lower Yerzley tan delta.

I claim:

1. A vulcanizable compounded rubber composition where the rubber of said composition comprises at least one rubber selected from the group consisting of natural rubber and solution or emulsion polymerized rubbers and contains as the vulcanizing agents sulfur in an amount of from about 2.0 to 5.0 phr (parts by weight per 100 parts of rubber in the composition), zinc oxide in an amount of about 5.0 phr, a sulfenamide accelerator in an amount of from about 0.5 to 1.5 phr and an amide having the formula:

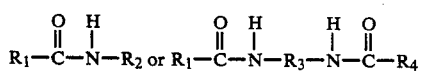

where $R_1$, $R_3$ and $R_4$ are linear, branched or cyclic $C_1$ to $C_{25}$ saturated or unsaturated, aliphatic, hydrocarbon radicals and where $R_2$ is hydrogen or a linear, branched or cyclic $C_1$ to $C_{25}$ saturated or unsaturated, aliphatic hydrocarbon radical and mixtures of the same, said amide being in an amount of from about 0.5 to 5.0 phr.

2. A vulcanizable compounded rubber composition according to claim 1 where said rubber is a solution polymerized high cis-polyisoprene, where said accelerator is N-cyclohexyl-2-benzothiazole sulfenamide and where said amide is stearamide.

3. A vulcanizable compounded rubber composition according to claim 1 containing additionally a vulcanization retarder in a minor amount by weight.

4. A vulcanizable compounded rubber composition according to claim 3 where said retarder is used in an amount of from about 0.1 to 0.5 phr and is N-(cyclohexylthio)phthalimide.

5. Vulcanized compounded rubber composition where the rubber of said composition comprises at least one rubber selected from the group consisting of natural rubber and solution or emulsion polymerized rubbers and contains as the vulcanizing agents sulfur in an amount of from about 2.0 to 5.0 phr (parts by weight per 100 parts of rubber in the composition), zinc oxide in an amount of about 5.0 phr, a sulfenamide accelerator in an amount of from about 0.5 to 1.5 phr and an amide having the formula:

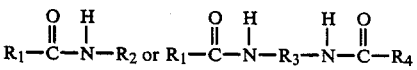

where $R_1$, $R_3$ and $R_4$ are linear, branched or cyclic $C_1$ to $C_{25}$ saturated or unsaturated, aliphatic, hydrocarbon radicals and where $R_2$ is hydrogen or a linear, branched or cyclic $C_1$ to $C_{25}$ saturated or unsaturated, aliphatic hydrocarbon radical and mixtures of the same, said amide being in an amount of from about 0.5 to 5.0 phr.

6. A vulcanized compounded rubber composition according to claim 5 where said rubber is a solution polymerized high cis-polyisoprene, where said accelerator is N-cyclohexyl-2-benzothiazole sulfenamide and where said amide is stearamide.

7. A vulcanized compounded rubber composition according to claim 5 containing additionally a vulcanization retarder in a minor amount by weight.

8. A vulcanized compounded rubber composition according to claim 7 where said retarder is used in an amount of from about 0.1 to 0.5 phr and is N-(cyclohexylthio)phthalimide.

* * * * *

UNITED STATES PATENT AND TRADEMARK OFFICE
CERTIFICATE OF CORRECTION

PATENT NO. : 4,882,394

DATED : NOVEMBER 21, 1989

INVENTOR(S) : JAMES G. KREINER

It is certified that error appears in the above-identified patent and that said Letters Patent is hereby corrected as shown below:

Column 2, Line 16, delete "and" and insert therefor --or--.

Column 2, Line 57, delete "lauroyamide" and insert therefor --lauroylamide--.

Column 3, Line 54, delete "2084-84" and insert therefor --2084-81--.

Column 3, Line 65, insert a space between "$T_{90}$" and "at".

Table II, Column 4, lines 10 and 29, delete "$\varsigma$" and insert therefor --$\sigma$--.

Table III, Column 4, line 58, move "1.155" to Column F and move ".770" to Column G.

Table III, Column 4, line 64, delete "$\varsigma$" and insert therefor --$\sigma$--.

Table IV, Column 5, line 61, and Column 6, line 9, delete "$\varsigma$" and insert therefor --$\sigma$--.

Table V, Column 6, lines 28 and 44, delete "$\varsigma$" and insert therefor --$\sigma$--.

UNITED STATES PATENT AND TRADEMARK OFFICE
CERTIFICATE OF CORRECTION

PATENT NO. : 4,882,394

DATED : November 21, 1989

INVENTOR(S) : James G. Kreiner

It is certified that error appears in the above-identified patent and that said Letters Patent is hereby corrected as shown below:

Table VI, Column 6, line 64, and Column 7, lines 16 and 29, delete "$\gamma$" and insert therefor --$\alpha$--.

Signed and Sealed this

Twenty-second Day of December, 1992

Attest:

DOUGLAS B. COMER

*Attesting Officer*  *Acting Commissioner of Patents and Trademarks*